United States Patent
Bailey et al.

(10) Patent No.: US 7,499,794 B1
(45) Date of Patent: Mar. 3, 2009

(54) SYSTEM AND METHOD FOR IMPROVED MAPPING OF A LOCATION

(75) Inventors: Gary C. Bailey, Beaverton, OR (US); Kenneth A. Zimmerman, Lake Oswego, OR (US); Louis J. Bailey, Kent, WA (US); John G. Wilson, West Linn, OR (US); Robert A. Armstrong, Canby, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/528,855

(22) Filed: Sep. 28, 2006

(51) Int. Cl.
*G06F 19/00* (2006.01)

(52) U.S. Cl. .................. 701/120; 701/301; 340/961

(58) Field of Classification Search ........... 701/120, 701/301; 340/961; 342/36, 450
See application file for complete search history.

(56) References Cited

U.S. PATENT DOCUMENTS 5,548,515 A * 8/1996 Pilley et al. .............. 701/120
6,163,309 A * 12/2000 Weinert .................... 345/7

* cited by examiner

*Primary Examiner*—Mark Hellner

(57) ABSTRACT

A database defining at least one exclusion zone of airport is described. The database includes a computer-implemented memory configured to store and allow retrieval of a plurality of points, the points defining a boundary of an exclusion zone associated with an airport, the area being prohibited for aircraft travel.

20 Claims, 4 Drawing Sheets

SYSTEM AND METHOD FOR IMPROVED MAPPING OF A LOCATION

BACKGROUND OF THE INVENTION

The present invention relates to vehicle situational awareness display systems, and more particularly to a vehicle display system that depicts a vehicle's position in relation to one or more exclusion zones.

Moving-map display systems have been used to enhance the situational awareness of the operators of ground vehicles and to assist in the movement of these vehicles along a desired route. The desired route may be specifically indicated or a general map may be provided from which the operator can distinguish the desired route. The presentation of the vehicle's position is provided on a display device and typically consists of a symbol representing the aircraft positioned on the display in relation to symbols representing the ground features surrounding the vehicle's position. The features represented may include the physical boundaries of roadways or pathways defined by paved areas, buildings or other permanent structures, natural features such as vegetation and bodies of water, signs, and markings such as roadway center stripes.

In order to determine the relationship of the vehicle symbol to the map representation, a position of the vehicle in relation to a reference point on the map is shown. This also assumes that the position of each feature of the map is established in relation to that reference point. Therefore, the moving-map display system interfaces with or incorporates a precise position location system, which may be a satellite based system such as the Global Positioning System or a terrestrial based system such as LORAN, that in conjunction with widely available computer processing capability can readily provide location with respect to the earth's surface.

Moving-map display systems have been used to improve situational awareness including applications in ground, marine, and air navigation. A database of the desired features to be represented on the display device is transmitted to the moving-map display system or is entirely encoded within the system itself. The representation of each of these features (designated in total as the "map") is positioned relative to the symbol representing the vehicle. The designation of the system as a moving-map display system implies that when the vehicle is in motion, the vehicle symbol remains fixed on the display while the map moves so the vehicle symbol remains correctly positioned on the portion of the map (and its features) being displayed. The vehicle symbol can be fixed at the center of the display or may be biased downward if more of a forward view from the vehicle is desired.

In particular, in an airport setting, an aircraft map may be defined by an aircraft surface database showing the runways or other travel paths available for an aircraft. Aircraft surface databases are typically represented by a series of points which define line segments that form a runway or taxiway centerline. The displaying of these line segments, along with the aircraft position representation, can provide the airport moving map display which can be used by the pilot to steer the aircraft along the runway and taxiway centerlines.

Aircraft surface databases further include information representative of width of the runway or taxiway from the centerline such that an aircraft crew can ascertain how close the aircraft gear is to the edge of the runway or taxiway. Accordingly, the aircraft surface databases also include the width of each runway and taxiway to allow calculation of runway and taxiway edge lines to represent the runway or taxiway as a rectangle.

However, runway and taxiway intersections can create an issue for the above defined model. Depending on the complication of the intersection (e.g., 5 or six way intersection), additional processing is required to transform a rectangular segment, represented by endpoints and a width, into a true representation of the intersection.

What is needed is a system and method for representing an aircraft map that does not require additional processing and smoothing to create a true representation. What is further needed is such a system and method where the aircraft map is represented based on the particular aircraft and an attribute of the aircraft.

SUMMARY OF THE INVENTION

One embodiment of the invention relates to a database defining at least one exclusion zone of the airport. The database includes a computer-implemented memory configured to store and allow retrieval of a plurality of points, the points defining a boundary of an exclusion zone associated with an airport, the area being prohibited for aircraft travel.

Another embodiment of the invention relates to a head up guidance system. The system includes a processing unit and a storage device coupled to the processing unit and having instructions configured to direct the processing unit to receive a plurality of points, the points defining a boundary of an area associated with an airport. The area is an area that is prohibited for aircraft travel.

Yet another embodiment of the invention relates to a method for representing a moving map for a vehicle. The method includes receiving a plurality of points representing at least one exclusion zone, the points defining a boundary of an area associated with an airport, the area being prohibited for aircraft travel, generating a moving map display wherein accessible areas for the vehicle are defined by the boundaries of one or more exclusion zones, and providing a representation of the vehicle on the moving map display showing the position of the vehicle relative to the one or more exclusion zones.

DETAILED DESCRIPTION OF THE PREFERRED EMBODIMENTS

In a broad aspect, the present application is directed to a system and method for mapping exclusion zones for a computer-implemented moving-map vehicle display system. An exclusion zone may be a prohibited area that is not intended for vehicle travel for any reason. An exclusion zone may be defined by a series of points defining a geometric space. An exclusion zone may be used, for example to define a grassy area located between runways on an airport map.

Figure 1:
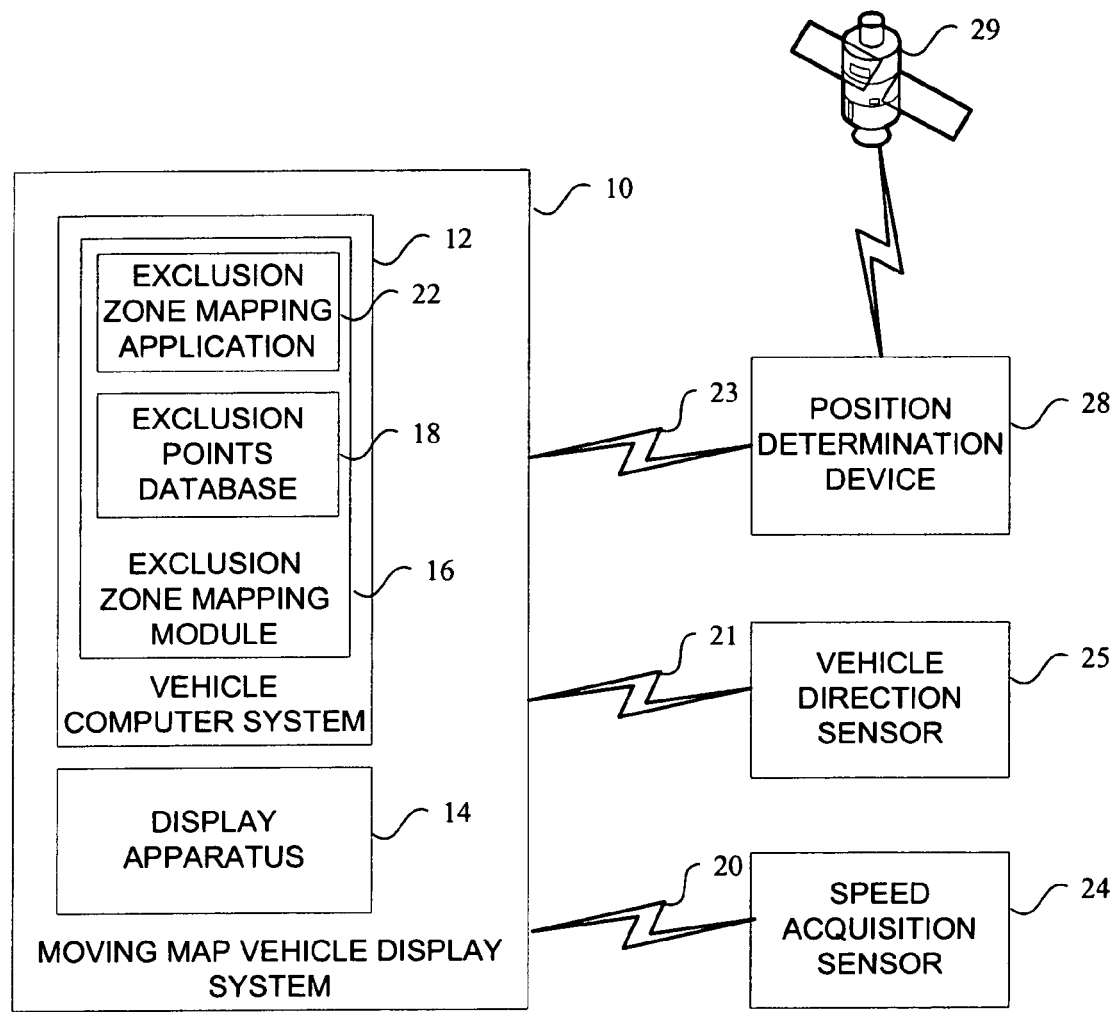
FIG. 1 is a moving-map vehicle display system, according to an exemplary embodiment.

Referring now to FIG. 1, a moving-map vehicle display system 10 is shown, according to an exemplary embodiment. The moving-map vehicle display system 10 includes a computer system, designated generally as 12, and display apparatus, designated generally as 14. Computer system 12 may be, for example, a microprocessor based unit dedicated to providing vehicle situational information, such as the Navigation Display Unit (NDU) developed and produced by Rockwell Collins. The NDU shown in FIG. 1 is targeted specifically for aircraft and provides both in-air and on-ground navigational information. Display apparatus 14 may be integrated with the computer system 12 into a single unit, as in the case of the Rockwell Collins NDU, or can be a separate unit provided signals by the computer system. In either case, display apparatus 14 may include a Cathode Ray Tube (CRT), Liquid Crystal Display (LCD), or other type of display to visually present information from computer system 12.

Computer system 12 includes an exclusion zone mapping module, designated generally as 16. Exclusion zone mapping module 16 includes an exclusion points database 18 for defining one or more exclusion zones. Exclusion points may be longitudinal and latitudinal values representative of a geometric shape defining an exclusion zone. The exclusion points may be endpoints of line segments that define the edges of runways and taxiways for an airport. According to an alternative embodiment, the exclusion points may be used to define a three-dimensional geometric space representative of a three-dimensional exclusion zone. An exclusion zone application 22 utilizes the exclusion points from database 18, a vehicle position information 23, a direction of vehicle movement information 21, and input geographical information 26 to provide output geographical information to the display apparatus 14. The exclusion points database 18 map define exclusion zones reflective of real world features to be included in the presentation of a map display. For example, roadways, pathways, buildings and other structures, vegetation, and water features may all be represented by a series of exclusion points within the geographical information database. The number of exclusion points may be determined by the complexity of the exclusion zone being defined.

A speed acquisition sensor 24 is operatively associated with the computer system 12 for providing the vehicle speed input signal 20. The sensor 24 may be, for example, a device which determines the rate of tire revolution and converts this to a vehicle speed input signal, or an Inertial Measurement Unit which measures and integrates the vehicle's acceleration to produce a vehicle speed input signal, or a position sensor which determines and differentiates successive vehicle positions to produce a vehicle speed input signal.

A vehicle direction acquisition sensor 25 is also operatively associated with the computer system 12 for providing the direction of vehicle movement input signal 21. The sensor 25 may be, for example, a compass or magnetic flux valve which indicates the vehicle's direction in relation to magnetic north and thereby provide the direction of vehicle movement input signal 23, or a position sensor which determines and differentiates successive vehicle positions to produce the direction of vehicle movement input signal 23.

A position determination device 28 is operatively associated with the computer system for providing the vehicle position information 23. The position determination device 28 may be, for example, a satellite positioning receiver system (i.e. utilizing satellite 29) or terrestrial-based positioning receiver system located on-board the vehicle.

Figure 2:
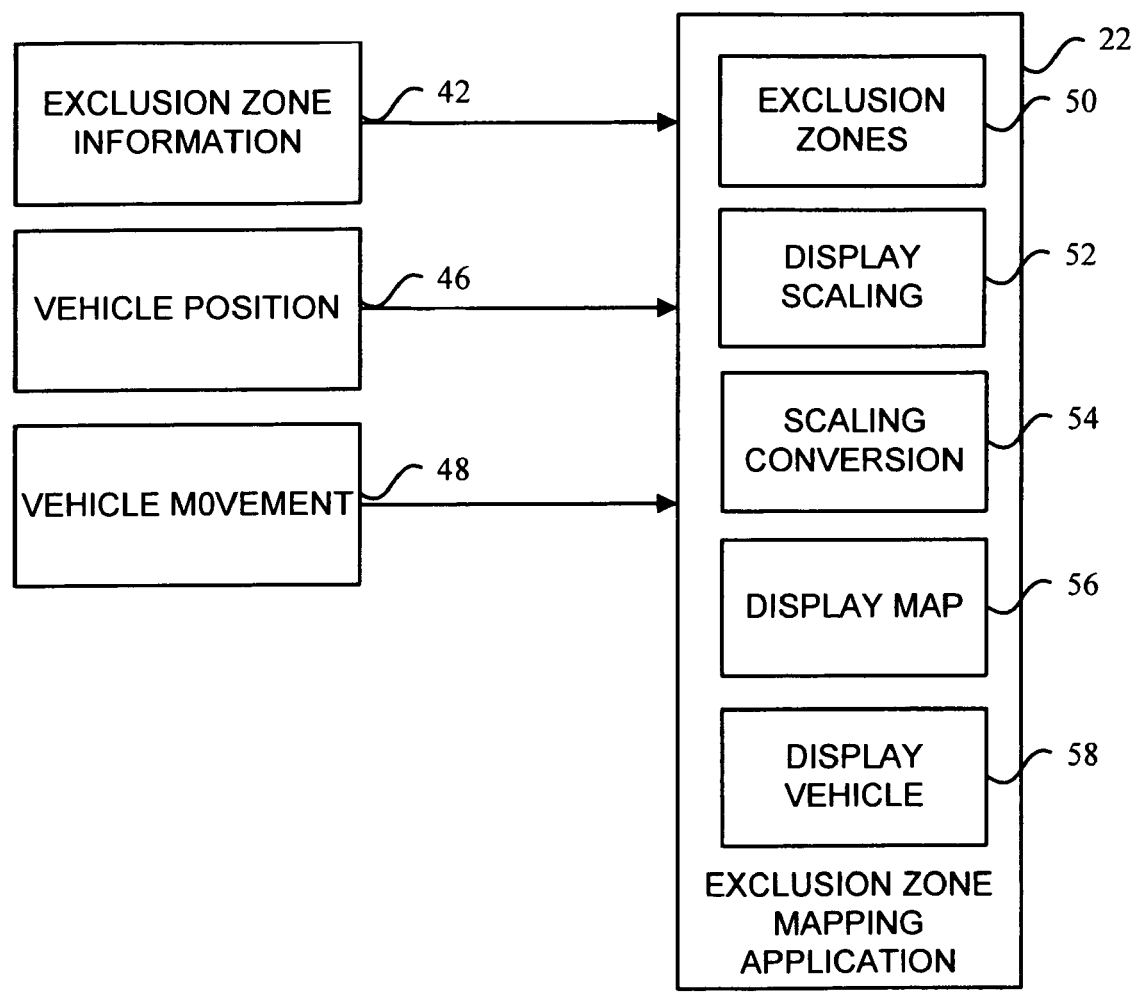
FIG. 2 is a schematic representation of the operation of the application module of the moving-map vehicle display system of FIG. 1, according to an exemplary embodiment.

Referring now to FIG. 2, a schematic representation of the operation of the exclusion zone application 22 is illustrated, according to an exemplary embodiment. The inputs to exclusion zone application 22 include exclusion zone information 42 from the exclusion points database 18, a map range (distance range value), a vehicle position 46 and direction of vehicle movement 48. The exclusion zone application 22 processes the received exclusion zone points to define all of the exclusion zones (block 50), described in further detail below with reference to FIG. 4. The display scaling is used to determine the size of the exclusion zone (block 52). Items to be scaled are converted in accordance with the display scaling (block 54). Geographical items are also displayed in accordance with the conversion (block 56). A vehicle symbol is displayed in accordance with the conversion (block 58). The output from the exclusion zone application 22 is provided to the display apparatus 14.

The exclusion zone application 22 is a function resident within the computer system 12. Typically, this function appears as software code forming a portion of the computer system's operational software program. The exclusion zone application 22 may interact directly with and control the interface circuitry within the moving-map vehicle display system 10, which inputs and processes, for example, a direction of vehicle movement signal 21 received from a vehicle direction acquisition sensor 25. The application module also may interact directly with the geographical database also resident within the moving-map vehicle display system to obtain input geographical information.

Although depicted in FIG. 1 as a vehicle panel mounted display system, the advantages of the present application are equally applicable to hand-held displays, head-up displays (HUD), or eye-glass and helmet integrated displays. Such technologies represent newer display concepts than traditional panel mounted displays and are often found in certain operating environments that have limited space or require improved see-through visibility.

Figure 3:
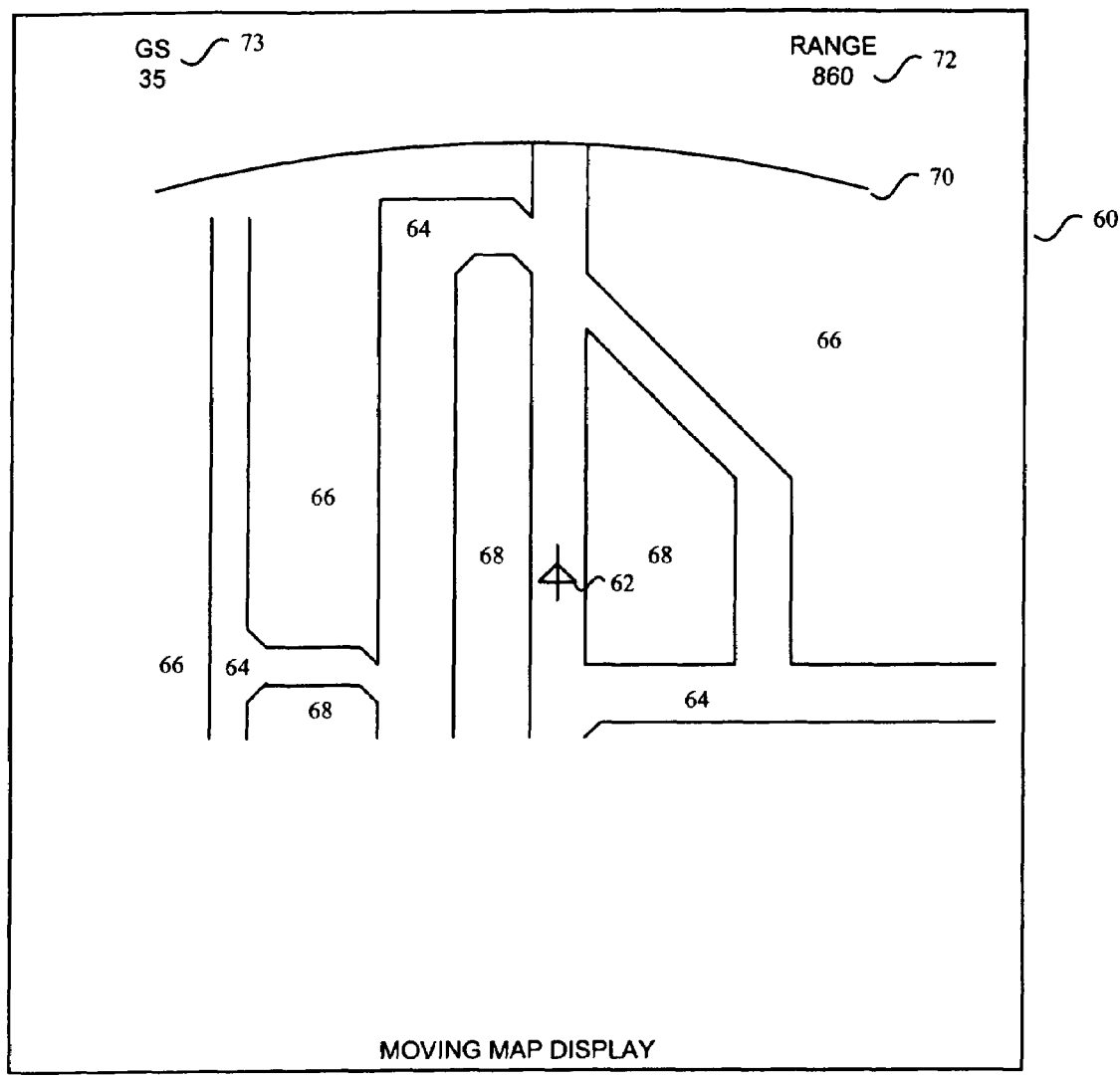
FIG. 3 is an example of an instantaneous or "snap-shot" of the display presentation provided to the operator of the vehicle using the moving-map vehicle display system of FIG. 1, according to an exemplary embodiment.

FIG. 3 depicts an example of an instantaneous or "snapshot" of the display presentation provided to the operator of the vehicle, according to an exemplary embodiment. As shown, FIG. 3 illustrates a vehicle moving on a roadway as portrayed on the moving-map display 60 viewed by the operator. The display presentation includes a variety of vehicle position and speed information provided in relation to geographical features represented by symbols 62 to 70. This example depicts the vehicle as an aircraft taxiing on an airport's taxiways.

Symbols 62-73 will now be described in detail. Symbol 62 represents an aircraft as viewed from above and remains fixed on the display. The aircraft is shown on a map of an airport, defined by a number of interior exclusion zones 68 and one exterior exclusion zone 66. The aircraft is shown currently traversing an airport taxiway, an area not designated as an exclusion zone, as depicted by symbol 64. Other taxiways and runways within the distance range of the map presentation may also be defined by the one or more exclusion zones 68. As shown, each exclusion zone 68 may be defined and displayed using a variable number of exclusion edge line points, as many as are needed to define the geometric shape of the exclusion zone. All exclusion zones may be configured to have the same starting and ending point. According to the example shown in FIG. 3, an airport may be represented by a number of relatively simple geometric shapes defined by a small number of exclusion edge line points. Additionally, a full airport exclusion zone definition may include the exterior exclusion zone and all interior exclusion zones. The exterior exclusion zone may have a starting point and ending point that are the same. If the range of the airport is at full scale, the display may show all active runways, taxiways, gates (displaying of the exterior exclusion zone 66 and all of the interior exclusion zones 68).

The extent of the map presentation is bordered by an arc 70 along the top and cutoff by vertical lines at the tope of the display. The actual distance range that this display represents is provided by the digital readout 72, above the right edge of the arc, which indicates 850 feet from symbol 62 to the arc 70. The aircraft's current ground speed of 35 knots is indicated by a digital readout 73, GS 35, above the left edge of the arc.

Although FIG. 3 shows the system and method described herein in the context of a moving map display, the system and method may alternatively be used in other types of displays, such as a flight path display. Further, exclusions zone may be represent as three dimensional object within such three dimensional representing displays. A three dimensional exclusion zone may be representative of any three dimensional object such as a building, a geographic feature such as a mountaintop, tree, etc., restricted air space, etc. A flight path display illustrating the flight path of an aircraft through three-dimensional space may be configured to display the three dimensional exclusion zones. A three dimensional representation of an exclusion zone may convey additional information to a pilot such as a height of the exclusion zone, an intersection of the flight path and the exclusion zone, etc.

Figure 4:
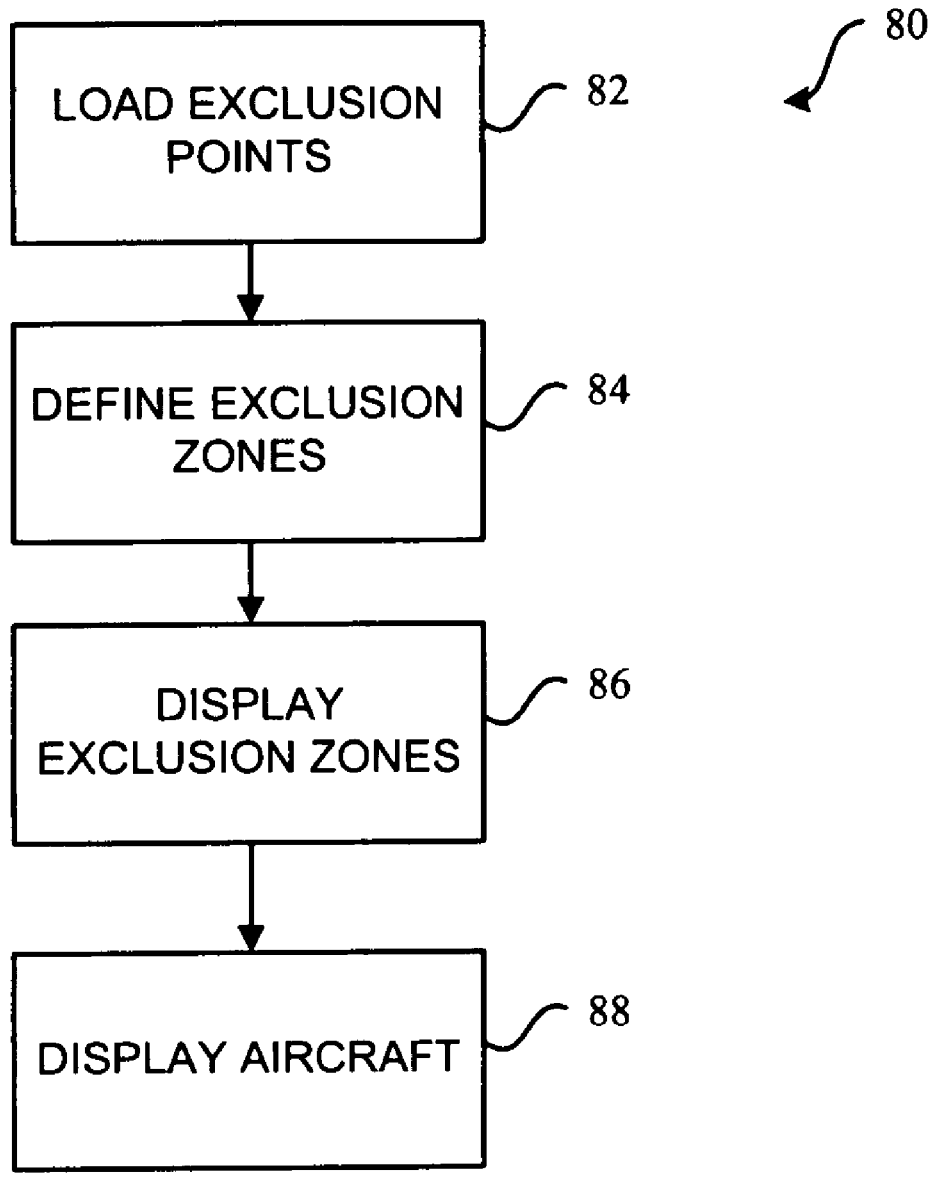
FIG. 4 is a flow diagram illustrating the steps completed by the moving-map vehicle display system in normal operation, according to an exemplary embodiment.

FIG. 4 is a flow diagram 80 of the steps completed by the moving-map vehicle display system in normal operation, according to an exemplary embodiment. Although a particular number of steps are shown in a particular order, it should be understood that the system and method for defining exclusion zones may include, more, fewer, and/or a different configuration of steps to perform the functions described here.

In a step 82, a plurality of exclusion points may be loaded from exclusion point database 18 by exclusion mapping application 22. The exclusion points may be representative of one or more exclusion zones. For each exclusion zone, the points may define a geometric shape representation of an exclusion zone. The points may further include an indication whether the exclusion zone is inside or outside of the geometric shape defined by the exclusion points. The exclusion points may yet further include an indication of the relative location of the exclusion zone within the map to be displayed including the exclusion zone.

The exclusion points that are received in step 82 may be dependent in part on information received from the operator and/or sensors on the vehicle. Exemplary information may include a type of aircraft, size of the aircraft, a military classification, a vehicle mission such as passenger, cargo, military, etc. weight of the aircraft, etc. Accordingly, a prohibited exclusion zone may be different for different aircraft. For example, an exclusion zone for a commercial aircraft may exist in an area of an airport that is reserved for military or cargo use.

In a step 84, the exclusion zone points and associated information may be used to define an exclusion zone. The exclusion zone may include a geometric shape defined by any number of points joined by straight lines, arcs, etc. The exclusion zone may be either inside or outside of the geometric space (for example, the geometric space may define the boundary of the airport).

In a step 86, the exclusion zone or zones are displayed using display 14. Displaying the exclusion zones may include displaying the exclusion zones in a shaded coloration and outside of the exclusion zones in an unshaded coloration to illustrate the difference to a pilot or navigator.

In a step 88, the aircraft representation is also displayed. This step may be performed concurrently with step 86. The aircraft representation may be displayed as shown and described above with reference to FIG. 3. The non conformal altitude (i.e., the zoom level of the display) may be varied in accordance with the proximity of the aircraft to an exclusion zone, the speed and/or direction of the aircraft, the path of the aircraft, etc.

Other embodiments and configurations may be devised without departing from the spirit of the invention and the scope of the appended claims.

What is claimed is:

1. A system defining one or more exclusion zones of an airport, comprising:
   a computer-implemented memory configured to store and allow retrieval of a plurality of points, the plurality of points defining boundaries of one or more exclusion zones associated with the airport, each exclusion zone being prohibited for aircraft travel, wherein one or more areas outside of the one or more exclusion zones are defined by the boundaries of the one or more exclusion zones and form one or more surface pathways of travel of the airport, wherein the one or more surface pathways of travel are not part of an exclusion zone; and
   a processing circuit configured to determine the one or more surface pathways of travel of the airport based on the plurality of points retrieved from the computer-implemented memory.

2. The system of claim 1, wherein the plurality of points are represented by a longitude and a latitude.

3. The system of claim 1, wherein the points define a three-dimensional area.

4. The system of claim 1, wherein the plurality of points are divided into at least a first subgroup of points for a first type of aircraft and a second subgroup of points for a second type of aircraft, wherein the processing circuit utilizes the first subgroup of points defining a first exclusion zone to determine a first surface pathway of travel of the airport for the first type of aircraft, wherein the processing circuit utilizes the second subgroup of points defining a second exclusion zone to determine a second surface pathway of travel of the airport for the second type of aircraft.

5. The system of claim 1, wherein the plurality of points are divided into at least a first subgroup of points for a first vehicle usage and a second subgroup of points for a second vehicle usage, wherein the processing circuit utilizes the first subgroup of points defining a first exclusion zone to determine a first surface pathway of travel of the airport for the first vehicle usage, wherein the processing circuit utilizes the second subgroup of points defining a second exclusion zone to determine a second surface pathway of travel of the airport for the second vehicle usage.

6. A head up guidance system, including
   a processing unit; and
   a storage device coupled to the processing unit and having instructions configured to direct the processing unit to
      receive a plurality of points, the plurality of points representing one or more exclusion zones, the plurality of points defining boundaries of one or more exclusion zones associated with an airport, the one or more exclusion zones being prohibited for aircraft travel, wherein one or more areas outside of the one or more exclusion zones are defined by the boundaries of the one or more exclusion zones and form one or more surface pathways of travel of the airport, wherein the one or more surface pathways of travel are not part of an exclusion zone, and determine one or more surface pathways of travel based on the plurality of points representing the one or more exclusion zones.

7. The head up guidance system of claim 6, wherein the points are represented by a longitude and a latitude.

8. The head up guidance system of claim 6, wherein the points define a three-dimensional space.

9. The head up guidance system of claim 6, wherein the plurality of points are divided into at least a first subgroup of points for a first type of aircraft and a second subgroup of points for a second type of aircraft, wherein the processing unit utilizes the first subgroup of points defining a first exclusion zone to determine a first surface pathway of travel of the airport for the first type of aircraft, wherein the processing unit utilizes the second subgroup of points defining a second exclusion zone to determine a second surface pathway of travel of the airport for the second type of aircraft.

10. The head up guidance system of claim 6, wherein the plurality of points are divided into at least a first subgroup of points for a first vehicle usage and a second subgroup of points for a second vehicle usage, wherein the processing circuit utilizes the first subgroup of points defining a first exclusion zone to determine a first surface pathway of travel of the airport for the first vehicle usage, wherein the processing circuit utilizes the second subgroup of points defining a second exclusion zone to determine a second surface pathway of travel of the airport for the second vehicle usage.

11. A method for representing a moving map for a vehicle, the method comprising:
receiving a plurality of points representing one or more exclusion zones, the plurality of points defining boundaries of the one or more exclusion zones associated with an airport, the one or more exclusion zones being prohibited for aircraft travel, wherein one or more areas outside of the one or more exclusion zones are defined by the boundaries of the one or more exclusion zones and form one or more surface pathways of travel of the airport, wherein the one or more surface pathways of travel are not part of an exclusion zone;
determining the one or more surface pathways of travel of the airport based on the recieved plurality of points representing one or more exclusion zones;
generating a moving map display showing the one or more surface pathways of travel for the vehicle based on the received plurality of points; and
providing a representation of the vehicle on the moving map display showing the position of the vehicle relative to the one or more surface pathways of travel.

12. The method of claim 11, wherein the points are represented by a longitude and a latitude.

13. The method of claim 11, wherein the points define a three-dimensional space.

14. The method of claim 11, further comprising dividing the plurality of points into at least a first subgroup of points for a first type of aircraft and a second subgroup of points for a second type of aircraft, wherein the first subgroup of points defining a first exclusion zone determines a first surface pathway of travel of the airport for the first type of aircraft, wherein the second subgroup of points defining a second exclusion zone determines a second surface pathway of travel of the airport for the second type of aircraft.

15. The method of claim 11, further comprising dividing the plurality of points into at least a first subgroup of points for a first vehicle usage and a second subgroup of points for a second vehicle usage, wherein the first subgroup of points defining a first exclusion zone determines a first surface pathway of travel of the airport for the first vehicle usage, wherein the second subgroup of points defining a second exclusion zone determines a second surface pathway of travel of the airport for the second vehicle usage.

16. The system of claim 1 further comprising a moving map display in a vehicle for displaying the one or more exclusion zones and resulting one or more surface pathways of the airport, wherein the processing circuit generates display information for the one or more exclusion zones and provides the display information to the moving map display.

17. The system of claim 16, wherein the resulting one or more surface pathways of the airport comprise an intersection with three or more intersecting surface pathways.

18. The head up guidance system of claim 6 further comprising a moving map display in a vehicle for displaying the one or more exclusion zones and resulting one or more surface pathways of the airport, wherein the processing unit generates display information for the one or more exclusion zones and provides the display information to the moving map display.

19. The head up guidance system of claim 18, wherein the resulting one or more surface pathways of the airport comprise an intersection with three or more intersecting surface pathways.

20. The method of claim 11, wherein the one or more surface pathways of the airport comprise an intersection with three or more intersecting surface pathways.

\* \* \* \* \*